United States Patent
Giannuzzi et al.

[11] Patent Number: 5,895,186
[45] Date of Patent: Apr. 20, 1999

[54] RELEASABLE BARRIER COATING FOR CHEMICAL ANCHOR BOLT

[75] Inventors: Louis N. Giannuzzi; Anthony C. Giannuzzi, 28 Doral Farm Rd., both of Stamford, Conn. 06902

[73] Assignee: Anthony C. Giannuzzi, Stamford, Conn.

[21] Appl. No.: 09/050,237

[22] Filed: Mar. 30, 1998

Related U.S. Application Data

[63] Continuation-in-part of application No. 08/720,921, Oct. 7, 1996.

[51] Int. Cl.⁶ ............................ F16B 39/00; F16B 39/02
[52] U.S. Cl. .................... 411/82; 411/258; 411/428; 411/903; 411/930
[58] Field of Search ............................ 411/82, 258, 428, 411/902, 903, 930; 405/259.5, 259.6

[56] References Cited

U.S. PATENT DOCUMENTS 5,221,170 6/1993 Duffy et al. .................... 411/903 X
5,490,365 2/1996 Roth .................................. 411/82 X
5,568,711 10/1996 Popp et al. ....................... 411/82 X

*Primary Examiner*—Neill Wilson
*Attorney, Agent, or Firm*—Michael Ebert

[57] ABSTRACT

A chemical anchor bolt and cap assembly installable in a hole drilled in masonry for fastening an object thereto. The threaded shank of the bolt and the hollow cap extending from its end are inserted into the hole, causing an uncured bonding agent deposited in the hole, such as an epoxy, to surround the cap and the shank. When the epoxy hardens the cap is then embedded in the epoxy to create a void below the end of the shank. Cast in the epoxy surrounding the shank is a female thread that complements the shank thread. To permit the bolt to turn and cause the end of the shank to advance into the void and thereby tighten the fastening, the threaded shank has coated thereon a releasable barrier layer that acts to masks surface irregularities in the shank thread and to slightly space the shank thread from the female thread. As a consequence, the female thread cast in the epoxy is functionally free of irregularities and is loosely intermeshed with the shank thread whereby the bolt can then be easily turned.

14 Claims, 3 Drawing Sheets

RELEASABLE BARRIER COATING FOR CHEMICAL ANCHOR BOLT

RELATED APPLICATION

This application is a continuation-in-part of our copending application Ser. No. 08/720,921 filed Oct. 7, 1996 entitled "CHEMICAL ANCHOR BOLT AND CAP ASSEMBLY," the entire disclosure of which is incorporated herein by reference.

BACKGROUND OF INVENTION

1. Field of Invention

This invention relates generally to chemical anchors installable in a hole drilled in masonry in which is deposited a chemical bonding agent to fasten a fixture or other object to the surface of the masonry, and more particularly to a chemical anchor bolt and cap assembly in which the threaded shank of the bolt is coated with a releasable barrier layers making it possible to turn the bolt and thereby tighten or remove the fastening.

2. Status of Prior Art

The term masonry refers to a construction of stone or similar material such as concrete and brick. The walls, ceiling and floors of many edifices are formed of masonry. In order, therefore, to fasten fixtures, machines, structural members or other objects to masonry, a masonry anchor is required for this purpose.

In the case of concrete or other forms of masonry, one cannot drill a hole therein and then tap this hole so that it can receive an anchor bolt, a threaded stud or other threaded mounting means to secure a fixture or other object to the face of the masonry. The nature of masonry is such that a cutting action to cut female threading into the bank of the hole cannot be effected, for this action will disintegrate the masonry material.

In order, therefore, to anchor a threaded rod or stud in a hole drilled in masonry, the present practice is to use a curable chemical bonding agent for this purposes. The typical agent of this type has two flowable components, one being a resinous bonding agent, the other a hardener therefor. The resins may be phenol, vinyl, ester or epoxy based. The two components, when stored, must be separated to prevent interaction therebetween. Many bonding agents currently available have an accelerated curing time and set within 10 to 30 minutes to afford substantial holding power. In practice, a charge of the resinous component and sufficient hardener intermixed therewith are deposited in the hole, and a threaded mounting stud is then inserted in the hole.

To this end, use may be made of a dispenser gun to inject a charge of the flowable bonding agent into the drilled hole. Or the charge may be contained in a capsule that is deposited in the drilled hole and is ruptured to release the bonding agent when the stud is inserted in the hole.

After the resinous interfacial layer between the stud and the bank of the hole cures and rigidifies, it then bonds itself both to the stud and to the masonry whereby the stud is permanently anchored in the hole. In order now to secure a fixture to the masonry face, the fixture which has a mounting hole therein is placed onto the projecting stud and locked thereto by a washer and nut.

A chemical anchor in accordance with the invention is useable with any type of curable bonding agent capable of setting in a reasonable time. The term epoxy, as hereafter used, is intended to cover a two-component epoxy and any other suitable curable bonding agent.

The concern of the present invention is with a chemical anchor that makes use of a bolt from whose head extends an externally-threaded cylindrical shank coated with a release agent. When the shank of the bolt is inserted in a drilled masonry hole having a charge of an uncured bonding agent deposited therein the release coating prevents this bonding agent, when cured and hardened from adhering to the shank.

A chemical anchor of this type is disclosed in the Kellison U.S. Pat. No. 4,642,964 and also in the Roth U.S. Pat. No. 5,590,360. In the chemical anchors disclosed in these patents, when the bonding agent hardens in the drilled masonry hole, a female thread is then cast in the hardened epoxy surrounding the shank. This female thread mates with the male thread of the release-coated shank; hence the bolt is then free to turn in the female thread in either direction.

In order to be able to tighten the fastening of the fixture against the masonry, a torque tool is used to engage the head of the bolt which is above the surface of the fixture and to turn the bolt to threadably advance the shank which is received in the masonry hole, thereby pressing the bolt head against the fixture.

To make this advance possible Kellison attaches a hollow cap to the end of the shank while Roth attaches a cylindrical housing to the end of the shank. In both cases, this creates in the hardened epoxy below the end of the shank in the drilled masonry hole a void to accommodate the advancing shank. As the shank advances into the void, the head of the bolt then presses harder against the surface of the fixture to tighten the fastening.

In Kellison, the release agent which coats the threaded shank to permit it to turn includes commercially-available waxes or greases. Kellisone's preferred release agent is PTFE (Teflon) particles dispersed throughout a grease or a grease-like lubricant. In Roth, the release agent is Teflon tape wrapped around the thread of the shank, or a wax or plastic coating applied to the thread.

The practical drawback of a release coating of the types disclosed in the Kellison and Roth patents is that they fail to take into account imperfections in commercially-available bolts having a threaded shank. These mass-produced bolts do not have a perfectly machined helical thread, for in manufacturing the bolt the shape of the thread will often vary to some degree along the length of the shank. The surfaces of the thread flanks are somewhat irregular or rough, and the actual pitch diameter of the thread varies within the allowable tolerances of standard thread specifications.

The fact that commercially-produced bolts are imperfect does not interfere with the normal uses to which these bolts are put. Thus if the bolt cooperates with a nut that turns on the threaded shank, irregularities on the surfaces of the shank thread will not prevent the nut from turning.

But when the same bolt is used for chemical anchoring in which the thread on the shank acts to mold a female thread in the epoxy surrounding the shank, then irregularities in the shank thread are reflected in the female threads even though the shank thread is thinly coated with a grease-like release agent. Similarly, when a Teflon tape is wrapped about the shank thread to serve as a release agents the tape conforms to the irregularities of the shank thread and these irregularities are reflected in the cast female thread.

Because irregularities impressed in the female thread in the epoxy surrounding the shank thread mate with irregularities in the surface of the shank thread, this interferes with the ability of the bolt to turn to tighten the fastening of the chemical anchor. Thus if there is a small projection on the surface of the shank thread, this will create a matching indentation in the female thread cast in the epoxy that will resist turning of the bolt.

Because in a typical commercially-produced bolt, irregularities on the shank thread are dispersed throughout the surface of the bolt, it becomes very difficult to turn the bolt to tighten the fastening, even when the release agent coating the shank is a lubricant.

When as in the Roth patent, the release agent is wax or plastic, it is difficult with these materials to create on the threaded shank of the bolt a barrier layer of uniform thickness on the flank surfaces of the thread, as is necessary in a releasable barrier in accordance with the present invention. Moreover, a wax coating will not survive when the wax coated bolts are stored in a heated environment as is often the case.

A drawback of grease-like release agents on anchor bolts is that when used at construction sites where holes are being drilled in concrete masonry, then concrete dust from these drilling operations is picked up by the grease and contaminate the release agent.

SUMMARY OF INVENTION

In view of the foregoing, the main object of this invention is to provide an improved release agent for coating the threaded shank of an anchor bolt installable in a hole drilled in masonry to fasten an object to the masonry, the shank being surrounded in the hole by a hardened bonding agent having a female thread cast therein that meshes with the shank thread, the release agent coating the shank allowing the bolt to turn to tighten or remove the fastening.

More particularly, an object of this invention is to provide a release agent of the above type that forms a releasable barrier layer on the shank thread that acts to mask irregularities on the surface of the shank whereby the female thread in the hardened agent is devoid of irregularities and therefore does not resist turning of the bolt.

Also an object of the invention is to provide a release agent in the form of a water-based flowable composition which when coated on the shank thread and dried then creates a releasable barrier layer thereon having a smooth surface.

Yet another object of this invention is to provide a composition of the above type having a lubricant dispersed therein that acts to lubricate the threaded shank when the bolt is turned to tighten or remove the fastening.

Briefly stated these objects are attained by a chemical anchor bolt and cap assembly installable in a hole drilled in masonry for fastening an object thereto. The threaded shank of the bolt and the hollow cap extending from its end are inserted into the hole, causing an uncured bonding agent deposited in the hole, such as an epoxy, to surround the cap and the shank. When the epoxy harden, the cap is then embedded in the epoxy to create a void below the end of the shank.

Cast in the epoxy surrounding the shank is a female thread that complements the shank thread. To permit the bolt to turn and cause the end of the shank to advance into the void and thereby tighten the fastenings the threaded shank has coated thereon a releasable barrier layer that acts to mask surface irregularities in the shank thread and to slightly space the shank thread from the surrounding epoxy. As a consequence, the female thread cast in the epoxy is free of irregularities and is loosely intermeshed with the shank thread whereby the bolt can then be easily turned.

A preferred embodiment of the release agent is a water-based composition which when coated on the threaded metal shank then quickly dries to form a releasable barrier layer thereon whose surface is substantially devoid of irregularities, the formulation being such that adsorption of the composition by the shank and its adhesion thereto are low whereby the layer is released from the shank when the bolt is turned in a direction to tighten the fastening or in a reverse direction to remove the bolt and unfasten the object from the masonry.

BRIEF DESCRIPTION OF DRAWING

For a better understanding of the invention as well as other objects and further features thereof, reference is made to the following detailed description to be read in conjunction with the accompanying drawing, wherein.

DETAILED DESCRIPTION OF INVENTION

The Chemical Anchor

Figure 1:
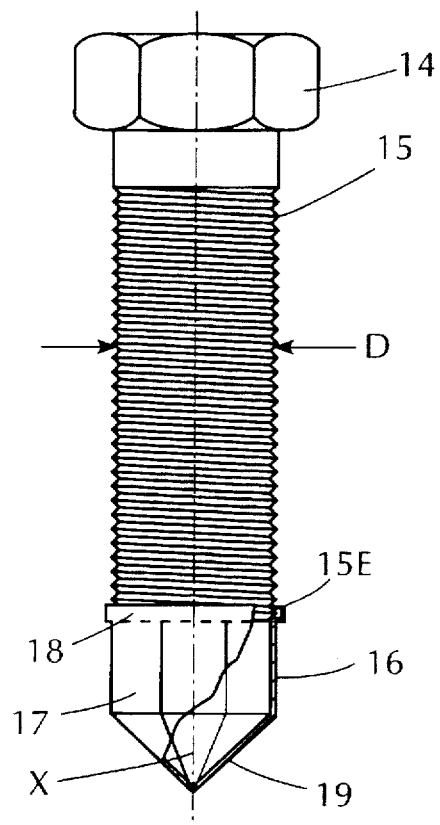
FIG. 1 is an elevational view of one embodiment of a chemical anchor and cap assembly in accordance with the invention.
Figure 4:
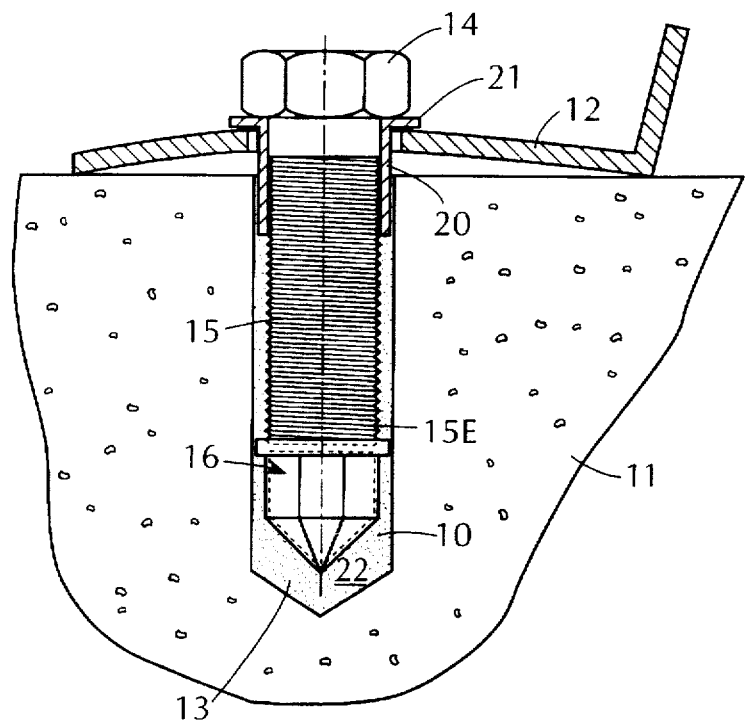
FIG. 4 is a sectional view of the assembly installed in a hole drilled in masonry and held chemically therein by an epoxy to fasten a fixture to the masonry, the assembly being shown in its condition prior to tightening.

Bolt and Cap Assembly:

FIGS. 1 and 4 illustrate one preferred embodiment of a chemical anchor bolt and cap assembly in accordance with the inventions FIG. 4 showing the assembly installed in a hole 10 drilled in masonry 11, such as a concrete wall, to fasten a fixture 12 or another object having a mounting hole against the surface of the wall.

Deposited in drilled masonry hole 10 is a charge of a curable bonding agent 13e such as a two-component epoxy, one component of which is a resin and the other a hardener therefor. Bonding agent 13e when cured and hardened, serves to chemically bond the assembly to the masonry. In practice use may be made of any other suitable masonry bonding agent.

The assembly includes a bolt fabricated of steel or other high-strength corrosion-resistant material, the bolt having an enlarged hexagonal head 14 engageable by a wrench or other torque tool. Extending from head 14 is an elongated cylindrical shank 15. Shank 15 which is externally threaded along its length to define a male thread, has a predetermined diameter D. The threaded surface of shank 15 is coated with a release agent to be later described, whose nature is such that the epoxy or other bonding agent in the drilled masonry hole does not adhere thereto. Threadably or otherwise coupled to extremity 15E of cylindrical bolt shank 15 and extending therefrom is a thin-walled cap 16 having a non-cylindrical shape. The cap may be fabricated of metal, such as aluminum or molded or otherwise formed of relatively stiff synthetic plastic material, such as PVC, polyethylene, polypropylene or other suitable material. When the assembly is inserted through a mounting hole in the fixture to be fastened into a drilled masonry hole in which is deposited a charge of uncured epoxy, the uncured epoxy then flows to surround the shank and the cap coupled to its end. And when the epoxy hardens in the masonry hole, formed therein is a female thread matching the release-coated male thread of the shank so that the bolt is now turnable relative to the cap which is embedded in the epoxy.

The shape and dimensions of the non-cylindrical cap 15 are such as to create in the drilled masonry hole below the end of the shank when the epoxy hardens, a hard epoxy column having a non-cylindrical cavity whose epoxy bank is defined by and lined with the non-cylindrical cap to create a partial barrier to the unimpeded advance of the shank.

To tighten the fastener, the bolt head is engaged by a torque tool and the bolt is turned to advance the end of the shank into the non-cylindrical cavity, the shank overcoming the partial barrier by cutting into the lined epoxy bank of the cavity. The resultant frictional engagement between the end of the shank and the partial barrier acts to resist loosening of the bolt should the masonry later be subjected to vibratory and other external forces seeking to turn the bolt out of the masonry hole.

Cap 16 shown in FIGS. 1 and 4 is defined by an octagonal side wall section 17 in axial alignment with the longitudinal axis of the shank, a coupling ring section 18 integral with the upper end of side wall section 17 and a generally conical end wall section 19 integral with the lower end of side wall section 17.

Coupling ring section 18, has an inner diameter matching diameter D of cylindrical shank 15 so that this ring section can be screwed or otherwise coupled to the end of the shank. End wall section 19 is generally conical, being constituted by eight converging triangular sides whose apexes come to a common point on the longitudinal axis X of the cap.

Figure 2:
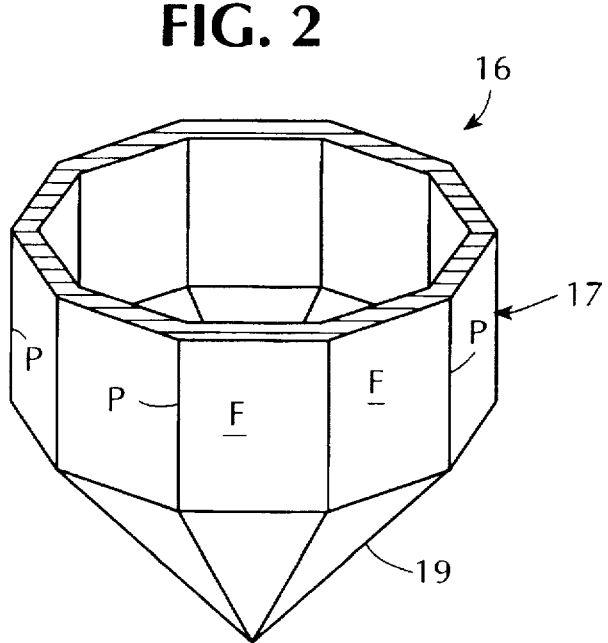
FIG. 2 is a separate perspective view of the octagonal-shaped cap.
Figure 6:
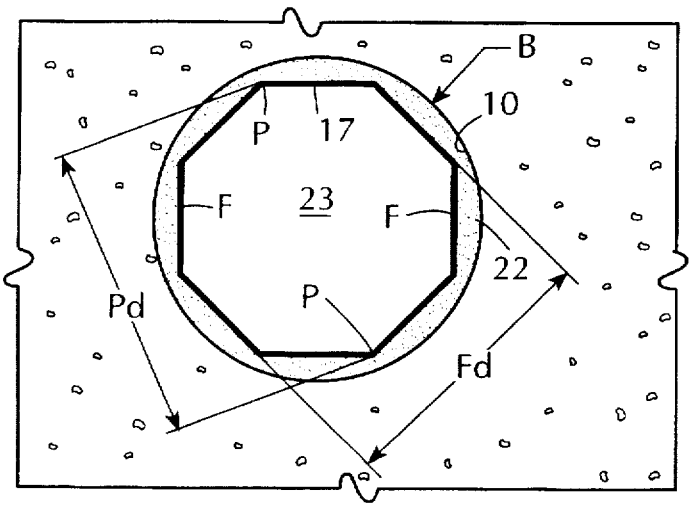
FIG. 6 is a transverse section taken through an epoxy column at the bottom of the drilled hole, the column having an octagonal cavity therein whose bank is lined by the cap.

As shown separately in FIGS. 2 and 6, octagonal sidewall section 17 is defined by eight angled flat facets F and eight triangular peaks P at the respective junctions of the facets. The dimensions of octagonal sidewall section 16 relative to the predetermined diameter D of the threaded cylindrical shank 15 are such that:

(a) the internal distance Pd between any pair of opposing peaks P of the octagon is equal to diameter D of the shank; and (b) the internal distance Fd between any pair of opposing facets F of the octagon is shorter than diameter D.

Hence if one draws a circle about octagonal cap 16 having the same diameter as diameter D of the cylindrical shank, this circle will encircle all of the peaks P of the cap. Facets F of the cap, like chords subtending arcs, will then divide this circle into eight segments. These segments are filled by hard epoxy when the assembly is installed in a drilled masonry hole.

Figure 3:
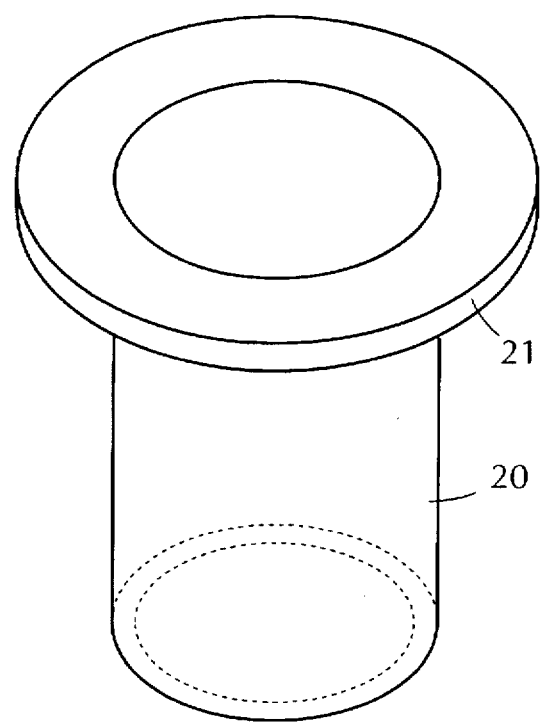
FIG. 3 is a perspective view of the deformable collar included in the assembly.

As separately illustrated in FIG. 3, the assembly also includes a deformable collar 20 having a circular flange 21 at its upper end. Collar 20, as shown in FIG. 4, is mounted on shank 15 below head 14 of the bolt. When the assembly is installed in drilled masonry hole 10 flange 21 then underlies head 14 of the bolt and collar 20 is then telescoped through the mounting hole in fixture 12 into the upper end of the drilled hole. Shank 14 and cap 16 coupled to its end are then immersed in the flowable charge of uncured epoxy 13 which rises in the hole to the level of deformable collar 20 to surround shank 15 and cap 16. Collar 20 prevents epoxy from entering the interface of the masonry and the fixture placed on its surface.

When the epoxy cures and hardens, then in the region in masonry hole 10 surrounding the release-coated shank 15 is a hard epoxy having impressed therein a female thread matching the male thread of the shank. Because of the release coatings the shank is not bonded to the epoxy, but is turnable in either direction in the female thread.

Figure 5:
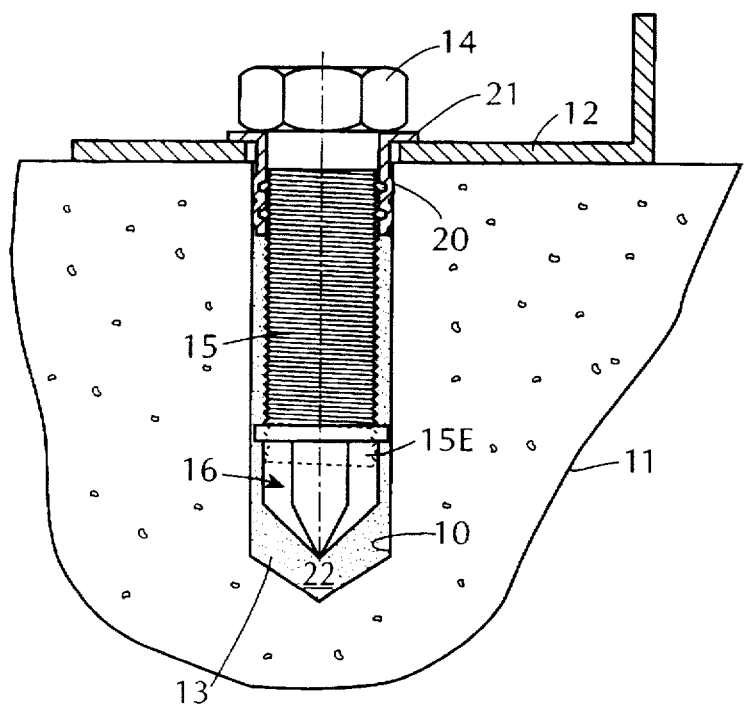
FIG. 5 is a sectional view of the installed assembly which is the same as that shown in FIG. 4 but after it has been tightened.

However, cap 16 is then embedded in the rigid epoxy in drilled hole 10 and is bonded thereto in the region below the end 15E of bolt shank 15. Hence as shown in FIGS. 4, 5 and 6, formed below end 15E of the shank is a column 22 of rigid epoxy having an octagonal cavity 23 therein whose octagonal bank is determined by and lined with the octagonal cap.

Since the internal distance Fd between any pair of opposing facets F of the cap is shorter than the diameter D of the shank 15, and the axis X of the cap is in line with the axis of the shank, the epoxy in the bottom of the drilled hole fills the eight segments behind the facets below the end of the shank to create in each segment a partial barrier B to impede the advance of the shank end into the cap.

When the assembly is installed in the drilled masonry hole, the head of the bolt lies over the surface of fixture 12, as shown in FIG. 4. And while flange 21 of the deformable collar is then interposed between this surface and the underside of the head, the fastening is not tight.

When the assembly is installed in the drilled masonry hole, head 14 of the bolt then lies over the surface of the fixture 12, as shown in FIG. 4. But the fastening is loose, for the head of the bolt does not then press the underside of the fixture into direct contact with the surface on the masonry. This lack of a tight fastening is figuratively represented in FIG. 4 which shows fixture 12 as being bowed and therefore not in contact with the surface of the masonry surrounding the hole drilled therein to receive the assembly.

A typical masonry surface is not perfectly level, nor is a fixture such as one fabricated of wood perfectly level, hence when a fixture overlies a hole drilled in masonry, the undersurface of the fixture is not in direct contact with the surface of the masonry. In order therefore to effect a tight fastening, the head of the bolt whose shank goes through the mounting hole in the fixture must be made to apply pressure to the fixture to bring it into direct contact with the masonry.

The deformable collar 20 is preferably made of nylon so that when subjected to a compressive force, it is then deformed and thereby somewhat shortened in length. Deformable collar 20 is interposed between the head 14 of the bolt and the rigid epoxy in the drilled masonry hole. Hence when the bolt is turned to press its head against the fixture to tighten the fastening, the collar will then yield to permit this action, as shown in FIG. 5.

Figure 7:
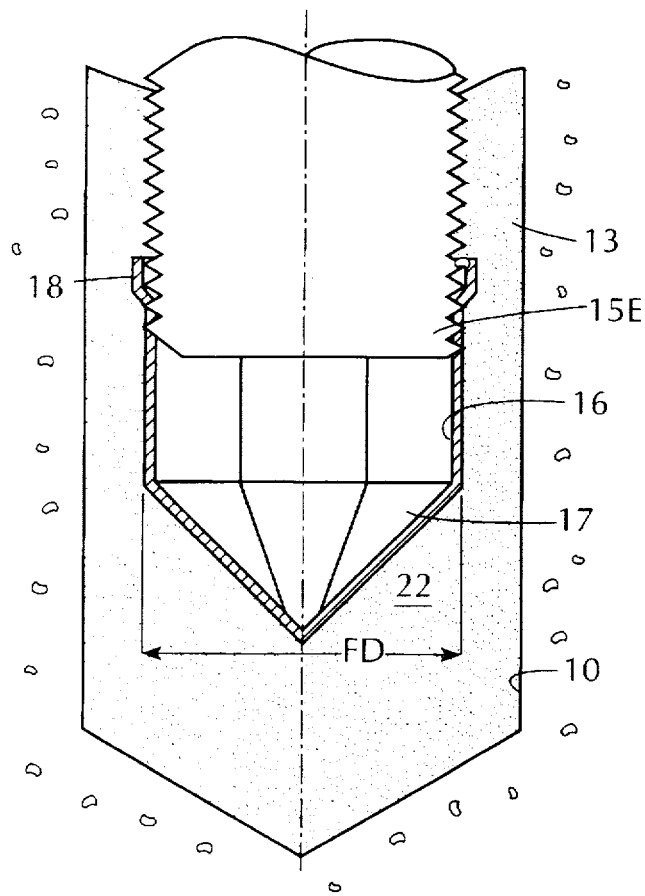
FIG. 7 illustrates the end of the shank of the bolt when it has advanced into the lined octagonal bank of the cavity and is frictionally held therein.

But the multi-segment partial barrier B created by the lined banking the cavity in the epoxy column below the end of the bolt shank must be overcome to permit advance of the shank into the cavity to effect tightening of the fastening. As the end of the shank is turned to advance into cavity 23, it cuts its way in the lined bank of cavity 23 in epoxy column 22 to tap the bank, and thereby overcomes the partial barrier, whereby end 15E of the shank then enters the cavity as shown in FIGS. 5 and 7.

And since the end 15E of the shank is then in frictional engagement with the partial barrier, this renders the installation resistant to vibratory and other external forces to which the masonry is subjected which seek to loosen the fastening by turning out the bolt.

Though the shape and dimensions of the octagonal cap 16 are such that the internal distance between opposing sides of the shell in one portion thereof (the peaks) is equal to the shank diameter and in another portion (the facets) the distance is shorter to create in the epoxy a partial barrier to the advance of the shank, the same result is obtainable with other polygonal cap shapes.

The Releasable Barrier Layer:

The present invention resides in a coating for the threaded metal shank of a chemical anchor bolt that forms thereon a releasable barrier layer that effectively masks surface irregularities in the shank thread and acts to slightly space this thread from the epoxy surrounding the thread in the masonry hole. Because of this barrier layer, there is cast in the epoxy a female thread that is substantially devoid of irregularities to permit turning of the bolt to tighten the fastening or to remove the fastening, depending on the direction in which the bolt is turned. By substantially devoid of irregularities is meant that the surface of the female thread is functionally free of irregularities and that whatever slight irregularities exist do not function to resist turning of the bolt.

It is essential in a masonry chemical anchor bolt that a void be created in the epoxy in the masonry hole below the end of the bolt shank, whereby when the bolt is turned to tighten the fastening, the end of the shank can then advance into the void. For this purpose the void can be created by a cap or housing attached to the end of the shank, as disclosed in the above-identified Roth and Kellison patents. Or the void can be created by caps in the manner disclosed in our copending applications above-identified, in which there is a partial barrier in the void that resists the advance of the shank into the void. The manner in which a void is created in the epoxy forms no part of the present invention whose concern is only with a release coating on the metal shank of the bolt to permit the bolt to turn.

A release coating in accordance with the invention takes form of a flowable composition that can be applied to the metal shank of the bolt by dipping, spraying or brushing. The nature of the composition is such that when dried it then forms a thin barrier layer that masks irregularities on the coated shank thread surface whereby cast in the epoxy surrounding the shank thread is a female thread that complements the helical thread defined by the barrier-coated shank thread but is devoid of irregularities.

Figure 8:
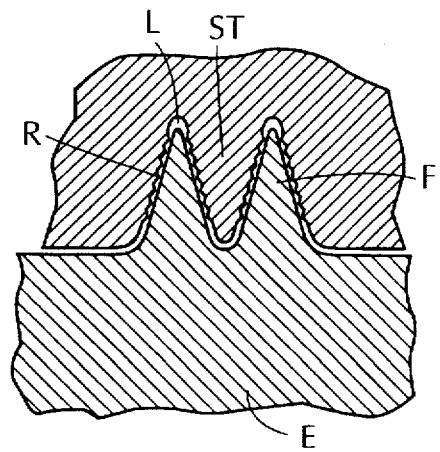
FIG. 8 schematically illustrates the meshing relationship of a threaded shank coated with a releasable barrier layer in accordance with the invention and the female thread in an epoxy surrounding the shank.

The viscosity of the coating is such that when coated on a rough metal surface, the outer surface of the coating is then relatively smooth. This is illustrated in FIG. 8 in which ST identifies a portion of the helical thread of the metal shank of an anchor bolt. It will be seen that the flanks of the shank thread have irregularities R thereon which roughen the surface of the flanks.

Coating the surfaces of shank thread ST is a releasable barrier layer L in accordance with the invention that effectively masks irregularities R therein and acts to space the surface of thread ST from female thread F cast in epoxy E surrounding the shank in the masonry hole.

Because female thread F conforms to the smooth outer surface of barrier layer L coating shank thread ST, the female thread is substantially free of irregularities. And because thin barrier layer L is interposed between the female and male threads these threads loosely rather than tightly intermesh and the bolt turns more freely.

The thickness of the barrier layer on the flanks of the shank thread is preferably about 5 mils, but the thickness is greater at the base of the helical groove running between the convolutions of the helical shank thread.

The composition serving as a release agent must satisfy the following requirements:

A. When the coating is dried, it then creates a semi-rigid compressible barrier layer on the surface of the shank thread that acts to slightly space this thread from the female thread cast in the epoxy surrounding the shank thread.

B. The barrier layer coating the shank thread must be releasable from the shank thread and the resin or be disintegratable to permit turning of the bolt to tighten the fastening or to remove the fastening.

One formulation that satisfies these requirements is a water-based composition that is quick drying and has low adsorption properties so that when coating the metal surface of the threaded shank, it does not strongly bond thereto and can therefore be released from the shank when the bolt is turned.

A preferred embodiment of such a water-based composition capable of producing a releasable barrier layer includes a polyvinyl acetal resin, a water solvent, and a pigment, such as titanium dioxide producing a white color. The composition also includes suitable plasticizers as well as anti-bacterial agents. The composition further includes a surfactant in an amount reducing adhesion of the coating to the metal shank.

However, the composition may be oil-based rather than water based and will therefore include an appropriate none aqueous solvent. An objection to an oil-based composition is that it may not be environmentally acceptable.

When an anchor bolt whose shank is coated by a composition in accordance with the invention to produce a releasable barrier layer is chemically anchored in a masonry hole to fasten an object to the masonry one must take into account the amount of torque then necessary to turn the bolt to tighten the fastening.

Because the layer is releasable from the shank of the bolt or the resin, it becomes possible to turn the bolt so that the male thread on the shank rotates within the female thread cast in the epoxy surrounding the male thread. But the coating interposed between the loosely intermeshed threads has a relatively high coefficient of sliding friction; hence it may take a high degree of torque to turn the bolt; thereby making it difficult to tighten the fastening.

To reduce the amount of torque that must be applied to the bolt to turn it, a coating in accordance with the invention may incorporates a lubricant which is normally inactive and does not impart grease-like characteristics to the surface of the coating For this purpose dispersed in the composition are micro-capsules whose diameter lies is in the micron range each capsule encapsulating a minute amount of a lubricant, such as a silicone oil. When the bolt is turned, the resultant pressure applied to the barrier layer surrounding the shank acts to rupture the capsules to release the lubricant which then lubricates the turning bolt and thereby reduces the amount of force necessary to turn the bolt.

Alternatively, the microcapsules dispersed in the compressible coating may be gas filled and therefore compressible. When the coating is subjected to pressure by the turning bolt, the capsules then act effectively as a lubricant. Or one may include in the composition a small percentage of a water-soluble lubricant or an emulsified lubricant to reduce the coefficient of sliding friction of the coating.

While there has been shown preferred embodiments of a releasable barrier coating for chemical anchor bolts in accordance with the invention, it will be appreciated that many changes may be made thereon without departing from the spirit of the invention.

We claim:

1. An anchor bolt installable in a hole drilled in masonry to fasten an object to the masonry, the bolt being provided with a threaded shank surrounded in the hole by a masonry bonding agent having cast therein a female thread that mates with the shank thread, said shank thread being coated with a release agent that makes it possible to turn the bolt to tighten or remove the fastening, said release agent comprising: a composition that when applied in a fluid state to the shank thread and dried then forms a releasable barrier layer thereon that masks irregularities on the surface of the shank thread whereby the female thread cast in the bonding agent is functionally devoid of irregularities, said barrier layer slightly spacing the female thread from the shank thread and causing the shank thread to loosely intermesh with the female thread to reduce the torque required to turn the bolt, said composition having a low tack characteristic whereby the composition, when dried, adheres lightly to the surfaces of the shank threads and is readily released therefrom.

2. An anchor bolt including a composition as set forth in claim 1, which when dried is compressible.

3. An anchor bolt including a composition as set forth in claim 1, that is water-based and dries quickly to form said layer on said shank thread.

4. A composition as set forth in claim 1 having low tack characteristics whereby the composition when dried adheres lightly to the surfaces of the shank thread and is readily released therefrom.

5. An anchor bolt including a composition as set forth in claim 1, in which the composition includes a water-soluble resin and a water solvent therefor.

6. An anchor bolt including a composition as set forth in claim 5, in which the resin is polyvinyl acetal.

7. An anchor bolt including a composition as set forth in claim 5, that further includes a surfactant reduces the adhesion of the composition to the surfaces coated thereby.

8. An anchor bolt including a composition as set forth in claim 1, that further includes a lubricant to reduce the coefficient of sliding friction of the composition.

9. An anchor bolt including a composition as set forth in claim 1, in which dispersed in the composition are microcapsules containing a lubricant.

10. An anchor bolt including a composition as set forth in claim 9, in which the lubricant is silicone oil.

11. An anchor bolt including a composition as set forth in claim 1, in which the bonding agent is an epoxy in which is cast said female thread.

12. An anchor bolt including a composition as set forth in claim 1, in which the barrier layer has a thickness on the flanks of the shank thread of about 5 mils.

13. An anchor bolt as set forth in claim 1, having a cap coupled to the end of the shank which is embedded in the bonding agent to create a void which permits the advance therein of the turning bolt to tighten the fastening.

14. An anchor bolt as set forth in claim 13, in which the cap is shaped to create a partial barrier to the advance of the bolt.

* * * * *